United States Patent [19]

Matsumoto et al.

[11] 4,231,339
[45] Nov. 4, 1980

[54] CONTROL DEVICE FOR EXHAUST GAS RECYCLED INTERNAL COMBUSTION ENGINE

[75] Inventors: Hiromitsu Matsumoto, Hamatsu; Keiichi Sugiyama, Shizuoka, both of Japan

[73] Assignee: Yamaha Hatsukoko Kabushiki Kaisha, Iwata, Japan

[21] Appl. No.: 48,746

[22] Filed: Jun. 15, 1979

[30] Foreign Application Priority Data

Jun. 16, 1978 [JP] Japan ............................ 53-72960

[51] Int. Cl.³ ............................................ F02M 25/06
[52] U.S. Cl. .................................... 123/568; 123/432; 123/308
[58] Field of Search ........... 123/119 A, 136 R, 119 B, 123/32 ST, 75 B

[56] References Cited

U.S. PATENT DOCUMENTS

| | | | |
|---|---|---|---|
| 3,418,981 | 12/1968 | VonSegbern et al. ......... | 123/32 ST |
| 3,809,039 | 5/1974 | Alquist .......................... | 123/75 B X |
| 3,941,105 | 3/1976 | Yagi et al. ...................... | 123/32 ST |
| 4,031,873 | 6/1977 | Banzhaf .......................... | 123/119 A |
| 4,043,304 | 8/1977 | Stump ............................ | 123/119 A |
| 4,068,637 | 1/1978 | Taramisa ........................ | 123/119 A |

*Primary Examiner*—Wendell E. Burns
*Attorney, Agent, or Firm*—Ernest A. Beutler

[57] ABSTRACT

An internal combustion engine having a relatively large main induction system that supplies the engine charge requirements at partial and full load and a relatively small cross-sectional area auxiliary induction system that provides the charge requirements at idle and low load conditions. An exhaust gas recirculating system is also incorporated with a control whereby exhaust gases are recirculated to the engine combustion chambers only at the time when the auxiliary induction system is supplying the major portion of the engine charge requirements. This permits effective combustion control without necessitating modifications to the conventional spark timing device of the engine.

10 Claims, 4 Drawing Figures

CONTROL DEVICE FOR EXHAUST GAS RECYCLED INTERNAL COMBUSTION ENGINE

BACKGROUND OF THE INVENTION

This invention relates to an internal combustion engine, and more particularly, to an improved control device for an exhaust gas recycled internal combustion engine.

It has recently been discovered that low speed running of an internal combustion engine can be significantly improved by delivering a major portion of the engine charge requirements to the chamber through a relatively small cross-sectional area auxiliary induction system. With such an arrangement, turbulence in the combustion chamber at the time of combustion is significantly increased so as to promote the rate of flame propagation. The increased combustion rate not only permits an increase in vehicle economy, but also provides for more effective exhaust gas emission control. The auxiliary induction system supplements a relatively conventional main induction system that supplies the engine charge requirements at higher load rangements. In this way, volumetric efficiency of the engine and maximum power output are not significantly affected.

It has also been the practice with internal combustion engines to employ exhaust gas recirculation (Egr) to improve the control of nitrous oxides in the exhaust gases. Conventional engines are, however, extremely sensitive to the amount of Egr and, as a result, poor running conditions are particularly prevalent with conventional engines employing Egr systems.

Because of its increased flame propagation, the use of the auxiliary induction system may normally require alteration in the spark timing of the engine from a conventional curve. With conventional engines, idle and off-idle spark timing must be considerably advanced due to the slow rate of combustion in the chamber. On the other hand, the use of the auxiliary induction system increases flame speed and results in a spark advance requirement retarded from normal spark timing when the auxiliary induction system is in use.

It is, therefore, a principal object of this invention to provide a control device for an exhaust gas recycled internal combustion engine that offers improved performance, particularly at low speeds with conventional spark timing devices.

It is another object of this invention to provide an induction system for an internal combustion engine using main and auxiliary induction systems and in which exhaust gas recirculation is employed only when the auxiliary induction system is providing a substantial portion of the engine charge requirements.

The introduction of exhaust gases into the combustion chamber with combustion engines significantly retards the rate of combustion in the chamber. Thus, with conventional engines, it is necessary to control the spark timing of the engine in relation to the amount of exhaust gases recirculated. It is extremely difficult, if not impossible, to provide such a spark timing control.

It is, therefore, a further object of this invention to provide a means for controlling the rate of combustion in relation to the amount of exhaust gases recirculated.

It is another object of this invention to provide an induction system for an internal combustion engine in which exhaust gases are recirculated to the chamber only through an auxiliary induction system which increases turbulence and thus compensates for the retarded rate of combustion caused by the exhaust gas recirculation.

SUMMARY OF THE INVENTION

This invention is adapted to be embodied in an internal combustion engine having a variable volume chamber in which combustion occurs, a main intake passage communicating with the chamber through a main intake port for delivering a charge thereto, an auxiliary intake passage communicating with the chamber through an auxiliary intake port and an emission system for discharging a gas for further treatment by combustion within the chamber. The auxiliary intake passage has a substantially lesser effective cross-sectional area than the main intake passage so that given mass flow of charge passing through this passage will enter the chamber at a significantly greater velocity than through the main intake passage. Valve means are provided for controlling the ratio of communication of the auxiliary and main intake passages with the chamber during a given cycle of engine operation. Conduit means deliver the gases from the emission system to the chamber. In accordance with this feature of the invention, means preclude the flow of emission gases to the chamber when a substantial portion of the chamber charge is being supplied by the main intake passage.

DETAILED DESCRIPTION OF THE PREFERRED EMBODIMENT

Figure 1:
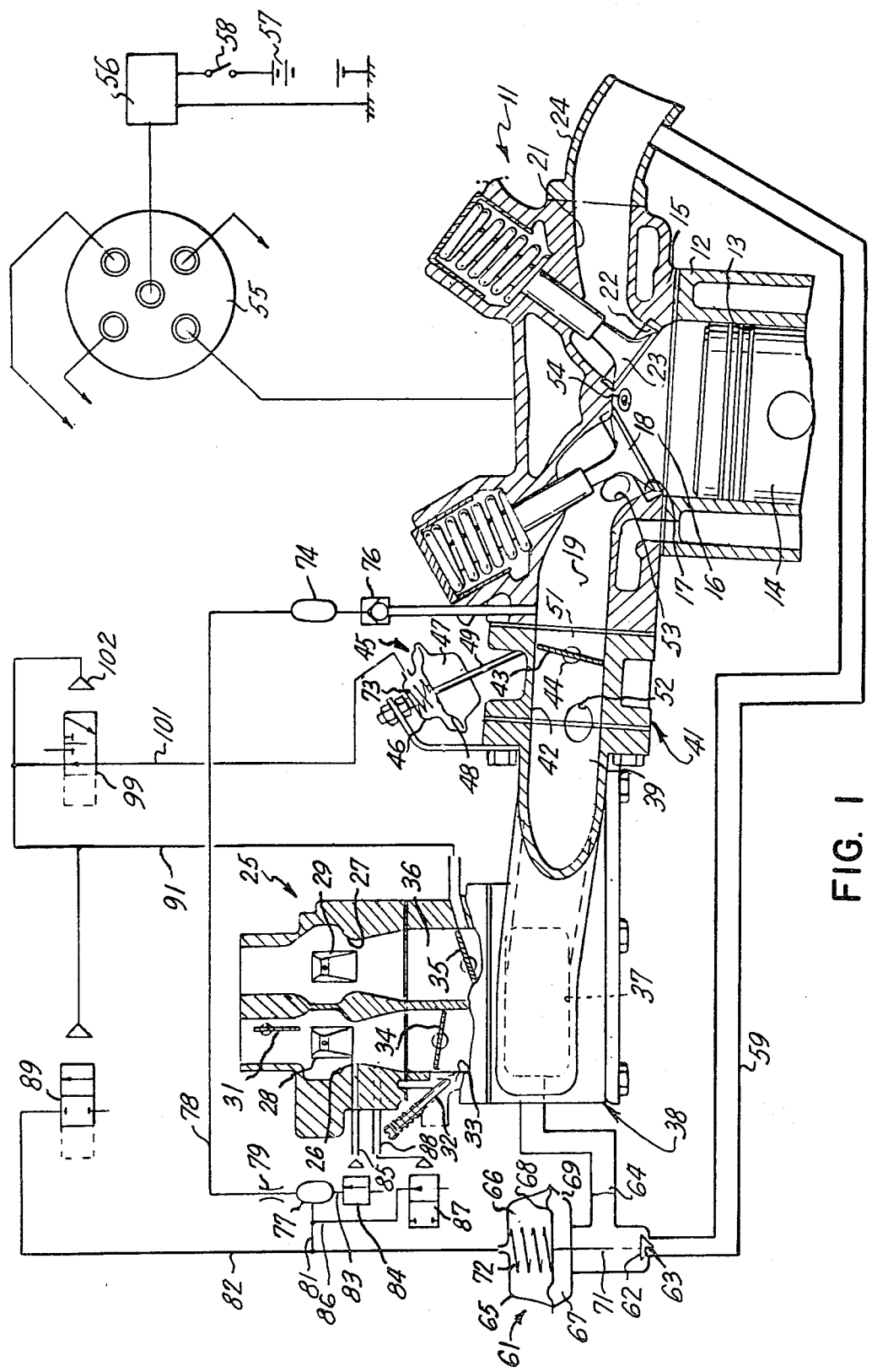
FIG. 1 is a partial schematic partial cross-sectional view taken through a single cylinder of a multiple cylinder combustion engine embodying this invention.

In FIG. 1, an internal combustion engine embodying this invention is shown partially in cross section and partially in schematic form and is identified generally by the reference numeral 11. The engine 11 includes a cylinder block 12 in which a plurality of cylinder bores 13 are formed. The cylinder bores 13 slidably support pistons 14 which are connected by means of connecting rods (not shown) to a crankshaft, as is well known in this art. Because this portion of the construction is conventional, it has not been illustrated. Only one cylinder bore and piston assembly has been illustrated since it is believed to be obvious to those skilled in the art how the invention is applied to multiple cylinders.

A cylinder head 15 is affixed to the cylinder block 12 in any known manner. The cylinder head 15 is formed with cavities 16 that cooperate with each of the cylinder bores 13 and pistons 14 to form chambers of variable volume in which the combustion occurs. A charge is delivered to each chamber through a main intake port 17 under the control of an intake valve 18, which is operated in any known manner. A plurality of main intake passages 19 are formed in one side of the cylinder head 15, each communicating with a respective main intake port and combustion chamber 16.

A main exhaust passage 21 is formed in the opposite side of the cylinder head 15 for each chamber 16. The exhaust passages 21 each terminate in exhaust ports 22 that communicate with the chambers 16 under the control of exhaust valves 23, which are operated in any known manner. The exhaust gases are communicated from the exhaust passages 21 in an exhaust manifold, indicated schematically at 24, for discharge to the atmosphere through a suitable exhaust system (not shown).

A charge is delivered to the chamber 16 from a charge forming device in the form of a two-barrel, staged carburetor, indicated generally by the reference numeral 25. The carburetor 25 has a primary barrel 26 and a secondary barrel 27, each of which is provided with a respective fuel discharge system including main discharge nozzles 28, 29. The primary barrel 26 is also provided with a choke valve 31 for cold start enrichment. The choke valve 31 is operated in any known manner.

As is typical with this type of carburetor, the primary barrel 26 is provided with an idle and low speed fuel discharge circuit, indicated generally by the reference numeral 32, which discharges into the discharge passage 33 of the barrel 26, contiguous to a primary throttle valve 34. The primary throttle valve 34 is controlled by means of the accelerator linkage (not shown) in a known manner. A secondary throttle valve 35 is positioned in the discharge passage 36 of the secondary barrel 27. The secondary throttle valve 35 may be operated by means of a linkage system (not shown) in a progressive fashion with the operation of the primary throttle valve 34 or may be operated automatically, either of which method is well known in this art and for that reason will not be described in detail.

The carburetor barrels 26 and 27 discharge into a plenum chamber 37 of an intake manifold, indicated generally by the reference numeral 38. Individual runners 39 extend from the plenum 37 to the respective cylinder head main intake passages 19. A valve block 41 is interposed between the manifold 38 and the cylinder head 15 and is provided with primary intake passages 42 that communicate the runners 39 with the cylinder head main intake passages 19. A control valve 43 is positioned in each passage 42, and these control valves are all supported for rotation on a common shaft 44.

The shaft 44 is actuated by means of a vacuum responsive diaphragm motor, indicated generally by the reference numeral 45. The vacuum motor 44 consists of a housing that is divided into chambers 46 and 47 by means of a diaphragm 48 that is clamped into this housing. The diaphragm 48 is connected by means of a piston rod 49 and lever 51 to the shaft 44 so as to rotate it, in a manner and for a purpose which will become apparent.

An auxiliary induction system is provided for delivering the charge from the carburetor 25 to the combustion chamber 16 at a high velocity under idle and low load conditions. In the illustrated embodiment, the auxiliary induction system consists of an inlet 52 formed in the manifold 38 and valve block 41 contiguous to their intersection. An auxiliary induction passage (not shown) extends from the inlet 52 through the valve block 41 and cylinder head 15 to an auxiliary intake port 53 formed in the cylinder head 15 contiguous to each main intake port 17. The effective cross-sectional area of the auxiliary induction passage is significantly less than that of the main intake passages, already described, so that a given mass flow of charge discharged from the auxiliary intake port 17 will flow at a substantially higher velocity than the same charge passing through the main intake system. This charge is delivered to the chamber 16 through the open intake valve 18 and main intake port 17. The auxiliary intake port 53 is positioned close enough to the chamber 16 so that the high velocity will not be dissipated at the time of introduction to the chamber 16.

The charge in the chamber 16 is fired by means of a spark plug 54 that is positioned in the cylinder head 15 in the respective chamber 16. The spark plugs 54 receive a high voltage charge at selected intervals from a distributor indicated generally by the reference numeral 55. The high voltage charge is delivered to the distributor 55 by means of a coil 56 that is in communication with the vehicle battery 57 through an appropriate circuit including an ignition switch 58. In accordance with this invention, the distributor 55 is of a type that employs only a governor type of spark advance. Thus, the spark advance is varied only in relation to the speed of the engine 11, as will be described.

An exhaust gas recirculation system is also provided for the engine 11 so as to assist in the control of emission of nitrous oxides. This system includes a conduit, indicated schematically at 59, which extends from the exhaust manifold 24 to an Egr valve indicated generally by the reference numeral 61. The Egr valve 61 includes a valve element 62 that cooperates with a valve seat 63 formed at the end of the conduit 59 so as to selectively control the return of the exhaust gases to the intake manifold plenum 37 through a conduit indicated schematically at 64.

The valve element 62 is controlled by a vacuum motor consisting of a housing 65 that is divided into an upper chamber 66 and a lower chamber 67 by means of a flexible diaphragm 68. The chamber 67 is vented to the atmosphere by means of an atmospheric port 69. A rod 71 connects the diaphragm 68 with the valve element 62 so that the position of the valve element 62 will be dependent upon the position of the diaphragm 68. The chamber 66 may be considered to be the vacuum chamber and a coil spring 72 is positioned in this chamber so as to normally urge the diaphragm 68 downwardly and to close the valve element 62 and prevent communication of the conduit 59 with the conduit 64. Under this condition, there will be no exhaust gas recirculation.

Before describing in specific detail the manner of operation of the engine 11, a general description will be given. The control valves 43 are operated in such a manner that when the engine is idling they will be closed and substantially all of the charge from the carburetor 25 will be delivered to the chambers 16 through the auxiliary induction system consisting of the inlets 52 and the auxiliary intake ports 53. This closure of the control valves 43 is accomplished by transmitting vacuum, in a manner to be described, to the actuator chamber 46 so that the action of a spring 73 in this chamber will be overcome and the atmospheric pressure which is transmitted to the chamber 47 through an atmospheric bleed port will force the diaphragm 48 upwardly to the position shown in FIG. 1 and effect closure of the control valves 43.

As a result of closure of the control valves 43, the intake charge will be delivered to the chamber 16 at a high velocity. This high velocity induction will cause significant turbulence in the chamber 16 at the time of ignition and thus promote rapid flame propagation. As an effect, combustion efficiency under this condition will be improved.

As the load on the engine progressively increases, the vacuum actuator 45 will diminish its effect and the control valves 43 will be progressively open so that a substantially greater portion of the intake charge is delivered to the chambers 16 through the main intake passages. Thus, volumetric efficiency will not be sacrificed nor will maximum power output of the engine.

As has been previously noted, the distributor 55 is provided with only a governor type of advance. Due to the rapid flame propagation at low loads provided for by the use of the auxiliary induction system, the spark should be advanced so that the peak pressure will be generated at the desired crank angle. However, in order to avoid the necessity for complicated distributor advance mechanisms, the exhaust gas recirculation control is provided in such a way that the exhaust gases will be recirculated at this time so as to retard the rate of combustion. Thus, conventional distributors using only governor type advance mechanisms may be employed. Generally, the valve element 62 of the Egr valve 61 is controlled in such a way that exhaust gases are recirculated only when the auxiliary induction system is provided a significant portion of the charge to the chambers 16. This control mechanism will now be described.

The primary vacuum source for the vacuum chamber 66 of the Egr valve 61 consists of an accumulator or reservoir 74 that is in communication with one of the cylinder head main intake passages 19 by means of a conduit 75 and check valve 76. The reservoir 74 is in communication with a second reservoir or accumulator 77 via a conduit, indicated schematically at 78, and an orifice 79. A conduit 81 extends from the accumulator 77 and intersects a conduit 82 that is in communication with the Egr valve vacuum chamber 66. A conduit 83 is provided for selectively venting the accumulator 77 to the atmosphere via a variable restriction control valve 84. The control valve 84 provides a restriction to the atmospheric communication of the reservoir 77 that is proportional to the air flow through the venturi of the primary barrel 26 of the carburetor 25. For this purpose, a controlling passage 85 interconnects the actuator portion of the valve 84 with this venturi. The purpose of the valve 84 is to provide an increasing amount of atmospheric venting of the reservoir 77 in response to a decreasing amount of air flow through the primary carburetor barrel 26.

For the purpose of selectively venting the accumulator 77 to atmospheric pressure, a line 86 is teed off of the conduit 81 and extends to a control valve 87. The valve 87 is operative to selectively close the line 86 or vent it to atmosphere. The valve 87 is controlled in response to the pressure in the barrel 26 downstream of its venturi section and upstream of the throttle valve 34. A conduit 88 is provided for transmitting this pressure signal. The arrangement is such that when the engine is at its idling condition with the throttle valve 34 closed, atmospheric pressure will be transmitted through the conduit 88 and the valve 87 will be positioned so as to vent to line 86 and accumulator 77 to atmosphere. When the throttle valve 34 is opened slightly, manifold vacuum will be experienced in the conduit 88 and the valve 87 will move so as to close the line 86.

A further control valve 89 is provided in the conduit 82 for selectively venting the conduit 82 to atmosphere or for closing this line. The valve 89 is controlled by the pressure in a conduit 91 that communicates with the secondary induction passage 36 downstream of the closed position of the secondary throttle valve 35. The arrangement is such that the valve 89 normally closes the conduit 82 from its atmospheric communication when the vacuum in the induction system is greater than a predetermined value. Said another way, the valve 89 vents the conduit 82 to atmosphere when the pressure in the induction system exceeds a predetermined value.

A valve 92 is also provided for controlling the transmission of intake manifold vacuum to the vacuum motor 45 of the control valves 43. For this purpose, the valve 99 is in communication with a conduit 101 which extends from the vacuum chamber 46 of the vacuum motor 45. The valve 99 selectively communicates the conduit 101 with either the conduit 91 or with the atmosphere. The action of the valve 99 is controlled by intake manifold vacuum by means indicated schematically at 102. As with the valve 89, the valve 99 normally provides communication between the conduits 91 and 101 when the pressure is lower than a preset value or greater than a predetermined vacuum. In a preferred embodiment of the invention, the valves 89 and 99 are set to actuate to their atmospheric venting conditions at substantially the same pressure.

OPERATION

FIG. 1 illustrates the position of the various components of the engine during idling operation. During idling there is sufficient negative pressure in the intake manifold transmitted through the conduit 91 to the valves 89 and 99 so as to maintain the valve 89 in its closed or non-venting position and to maintain the valve 99 in the position wherein communication between the conduits 91 and 101 is permitted. Thus, intake manifold vacuum will be exerted in the chamber 46 of the vacuum motor 45 and the atmospheric pressure acting on the underside of the diaphragm 48 will cause the valves 43 to be closed. Thus, as has been previously noted, all of the idle charges for the chambers 16 for the carburetor 25 will be supplied through the relatively small auxiliary intake system.

Even though the valve 89 closes the conduit 82 from atmospheric communication, the control valve 87 will be held in its open position by the substantially atmospheric pressure which is experienced in the conduit 88. Thus, the reservoir 77 will be vented and atmospheric pressure will exist on both sides of the diaphragm 68 of the Egr valve 61. The spring 72 will, therefore, urge the valve element 62 to its closed position and there will be no exhaust gas recirculation.

Normally, it is the practice to provide a retardation of the spark timing under idle due to the slow combustion which results with conventional engines. For this purpose, a vacuum advance and retard mechanism is normally incorporated into its distributor. As has been previously noted, however, the distributor 55 is provided with only a governor operated advance. Thus, the normal spark setting at idle will be appropriate for the rapid combustion which occurs at idle in connection with this invention.

Figure 2:
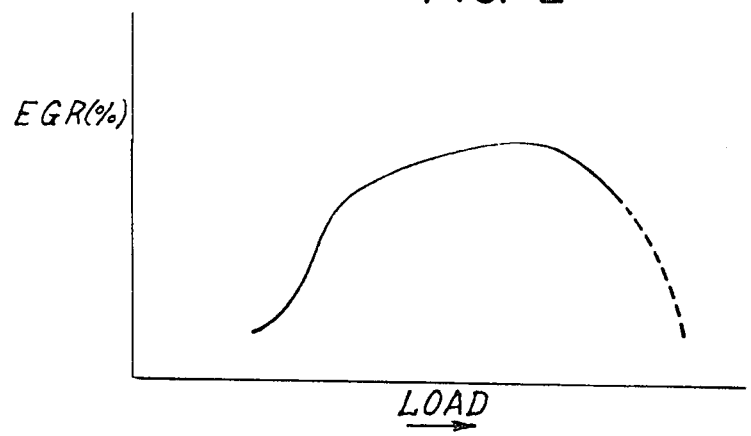
FIG. 2 is a graphic analysis showing the amount of exhaust gas recirculation relative to the load on the engine in conjunction with the illustrated embodiment of the invention.

As the load on the engine gradually increases and the primary throttle valve 34 is progressively opened, a sudden decrease in pressure in the conduit 88 will occur. Thus, the valve 87 will be moved so as to close the venting of the line 86 and a negative pressure will begin to build up in the reservoir 77. This negative pressure is built up through the conduit 75, check valve 76, accumulator 74, conduit 78 and orifice 79. As the vacuum increases in the reservoir 77, the negative pressure will be transmitted to the chamber 66 of the Egr valve 61 and the valve 62 will be opened so as to begin the recirculation of exhaust gases. The relationship of the amount of exhaust gas recirculation to engine load at a constant rpm is shown in FIG. 2 wherein the amount of exhaust gas recirculation is shown on the abscissa, and the engine load is shown on the ordinate. As has been previously noted, the venting of the reservoir 77 to atmosphere by the valve 84 is controlled by the air flow through the venturi of the primary barrel 26. The greater the air flow the greater restriction to venting and, accordingly, the amount of exhaust gases recirculated, the control of the valve 61 will increase up to a predetermined point. The flow condition is not completely linear since the vacuum in the intake manifold will also decrease and the actual amount of exhaust gas recirculation to load will follow the curve shown in the solid line portion of FIG. 2.

When intake manifold vacuum falls to a predetermined value (absolute pressure rises to a predetermined value), the valve 89 will be actuated so as to vent the conduit 82 to atmosphere. At this time, the Egr valve 61 will be immediately closed and exhaust gas recirculation will be stopped from continuing along the dotted line portion of the curve in FIG. 2.

The control valves 43 are also maintained in their closed position during idle and part load operation due to the existence of a partial vacuum in the chamber 46 of the vacuum motor 45 for these valves. Thus, a major portion of the charge to the chambers 16 will be delivered through the auxiliary induction system. If desired, this motor may be calibrated so as to provide some flow through the main induction system at intake manifold vacuums less than that necessary to actuate the valve 99. In any event, once the intake manifold vacuum rises to the pressure at which the valve 89 has been actuated, the valve 99 will also be actuated so as to vent the conduit 101 to the atmosphere. At this time, atmospheric pressure will exist in both chambers 46 and 47 of the vacuum actuator 45 and the valves 43 will be moved to their fully opened position. At this time, a substantial portion of the intake charge for the chamber 16 will be delivered through the main induction system and the effect of the auxiliary induction system will be substantially diminished. Thus, it should be noted that the larger portion charge to the chambers 16 is delivered through the main induction system simultaneously with the point at which the recirculation of exhaust gases is stopped.

Figure 3:
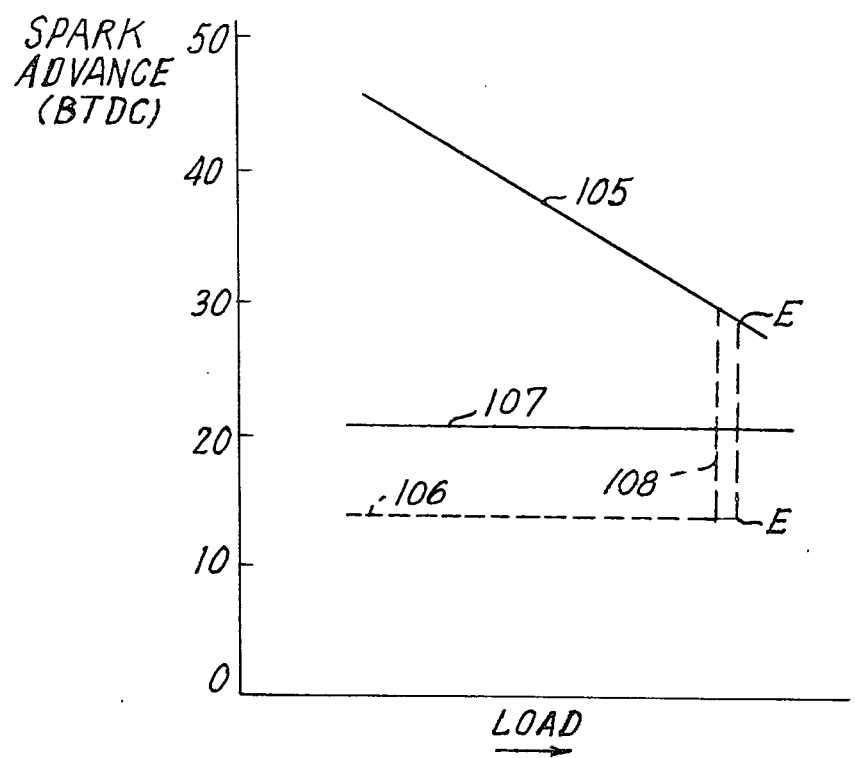
FIG. 3 is a graphic analysis showing the relationship of spark timing to engine load at constant rpm.

The significance of the effect of exhaust gas recirculation on spark timing may be understood by reference to FIG. 3 wherein the various curves illustrate spark advance on the ordinate and engine load on the abscissa at constant rpm. The solid line curve 105 represents the required spark advance under the condition when there is no exhaust gas recirculation and when the control valves 43 are in their fully opened position so that the substantial portion of the charge is delivered to the chamber 16 through the main induction system. This approximates the required spark timing for a conventional engine. As will be noted, at low loads a fairly substantial degree of spark advance is required and the degree of spark advance is generally linearly related to engine load.

The dotted line curve indicated by the reference numeral 106 indicates required spark timing when there is no exhaust gas recirculation and the control valves 43 are fully closed. This is equivalent to the condition when all of the charge requirements are supplied through the auxiliary induction system. As noted in relation to the curve 105, the degree of spark advance is substantially reduced, this being due to the rapid flame propagation resulting from the induction system turbulence. It should also be noted that the degree of spark advance is substantially uniform with respect to load when only the auxiliary induction system is supplying the combustion chambers with the mixture.

The solid line curve 107 represents actual ignition timing provided by the distributor 55 having only a governor advance. This curve is chosen as to substantially correspond to the required ignition timing when the control valves 43 are closed and the Egr valve 61 opened. As has been previously noted, the introduction of exhaust gases into the engine chamber 16 tends to retard the rate of combustion. Thus, more spark advance is required under this condition so as to provide the point of peak combustion chamber pressure at the desired crank angle.

Considering the condition at a given load, as represented by the dot-dash line 108, if exhaust gas recirculation is discontinued, the spark timing as set by the curve 107 will be advanced from the required spark timing as represented by the line 106. Thus, there is a likelihood of preignition or knocking. In accordance with this invention, this condition is avoided by opening of the control valves 43 simultaneously with the discontinuance of exhaust gas recirculation. As has been previously noted, this is effected by having both of the valves 89 and 99 vent their respective conduits to atmosphere at the same time. Thus, the control valves 43 will be forced open at the same time that the Egr valve 61 closes.

Figure 4:
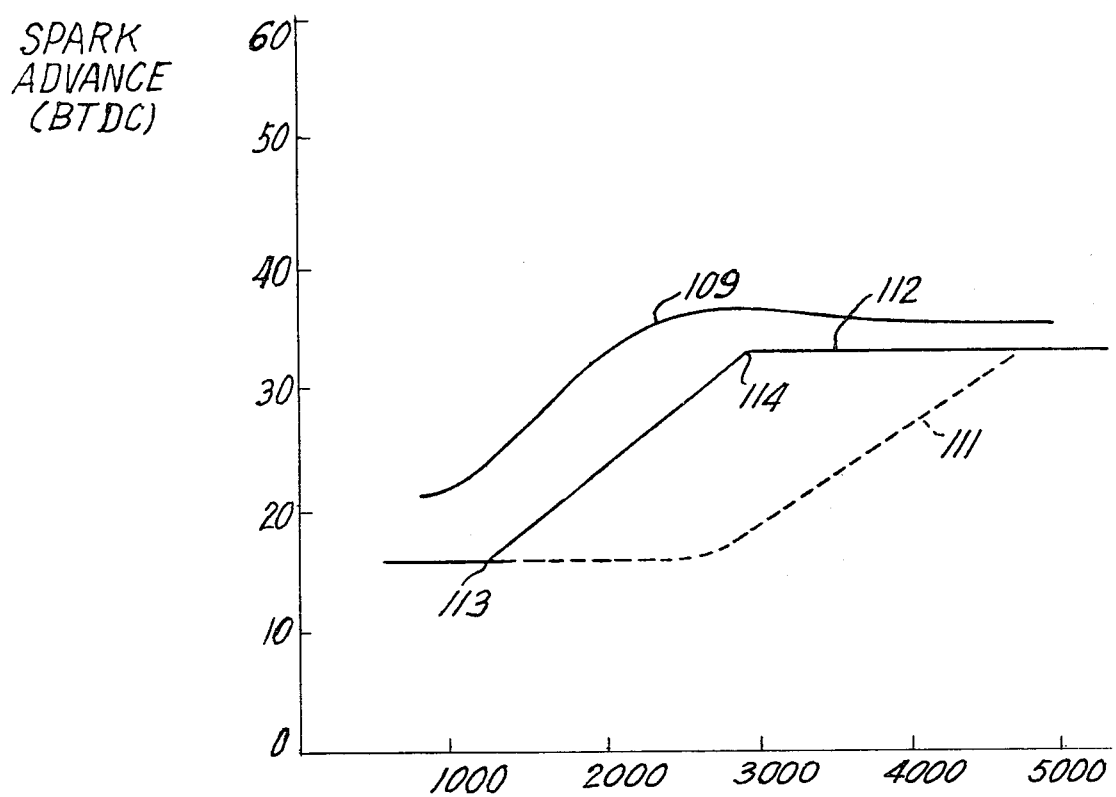
FIG. 4 is a graphic analysis showing the relationship of spark timing to engine speed under low load conditions.

Turning now to FIG. 4, spark advance is shown on the ordinate and engine speed is shown on the abscissa. This curve represents engine timing under low load conditions. In this series of curves, the curve 109 represents the required spark advance with no exhaust gas recirculation and the control valves 43 in their fully opened position. Thus, the main induction system will be supplying a major portion of the charge requirements of the chamber 16.

The dotted line curve 111 shows the required ignition timing with no exhaust gas recirculation and the control valves 43 fully closed. As has been previously noted, the required spark timing is substantially constant at low and medium speeds with an advance being required at higher engine speeds. The solid line curve indicated by the numeral 112 indicates the actual timing provided by the distributor 55. The advance is constant up to a given speed indicated by the point 113 at which point the governor advance becomes operative and continues to advance the spark up until the point 114 at which the spark timing remains constant at this advanced angle.

By appropriately controlling the Egr valve 61 and the control valves 43, the curve 112 of the distributor 55 may be made to substantially satisfy the requirements of the engine. At idle, as has been noted, there is no exhaust gas recirculation. Thus, the fixed advance of the distributor 55 suits the requirements of the engine operating with the entire charge requirements of the chamber 16 being served through the auxiliary induction system. As the engine reaches off-idle condition, the centrifugal advance of the distributor 55 causes the spark advance curve to deviate from the required curve as shown by the line 111 in FIG. 4. However, at this time, exhaust gas recirculation is started which retards combustion and requires spark advance. Thus, the amount of exhaust that is recirculated is tailored so as to insure that the spark timing provided by the distributor 55 will be appropriate.

When the point 114 on the advance curve 112 is reached, it will be noted that the advance curve closely approaches the required advance curve 109 of the engine operating with the substantial portion of the charge being supplied through the main induction system. Thus, at this point in time exhaust gas recirculation is stopped and the control valves 43 are opened so that the charge will be supplied to the chamber 16 through the main induction system.

It should be readily apparent from the foregoing description that the described system of the exhaust gas recirculation control in relation to control of the flow to the chambers through the main and auxiliary induction passages is such that a simple distributor employing only governor advance can be used. The arrangement is also such that a significant amount of exhaust gas recirculation is possible while at the same time good fuel economy and exhaust emission control are obtained. It is to be understood that this description is only that of the preferred embodiment of the invention and that various changes and modifications may be made without departing from the spirit and scope of the invention as set forth by the appended claims.

We claim:

1. In an internal combustion engine having a variable volume chamber in which combustion occurs, a main intake passage communicating with said chamber through a main intake port for delivering a charge thereto, an auxiliary intake passage communicating with said chamber through an auxiliary intake port, said auxiliary intake passage having an effective cross-sectional area substantially less than the effective cross-section area of said main intake passage for causing a given mass flow of charge through said auxiliary intake port to enter said chamber at a significantly greater velocity, an emission system for discharging a gas for further treatment by combustion within said chamber, valve means for controlling the ratio of communication of said auxiliary and main intake passages with said chambers during a given cycle of operation, and conduit means for delivering the gases from said emission system to said chamber, the improvement comprising means for precluding flow of said emission system gases to said chamber when a substantial portion of the chamber charge is being supplied by said main intake passage.

2. The invention as set forth in claim 1, wherein the emission system gases are introduced at a point where they may flow to the chambers through the auxiliary intake passage.

3. The invention as set forth in claim 2, wherein the auxiliary intake passage and the main intake passage have a common inlet, the emission system gases being delivered to the common inlet.

4. The invention as set forth in claim 1, wherein the means for precluding flow of emission gases to the chamber also preclude flow of emission gases to the chamber when the engine is operating at idle.

5. The invention as set forth in claim 1, wherein the valve means comprises a control valve means positioned in the main intake passage for controlling the flow therethrough, the emission gases comprising exhaust gases and further including Egr valve means for controlling the flow of exhaust gases to the chamber, the means for precluding flow of the exhaust gases to the chamber comprising means for closing said Egr valve means simultaneously with opening of said control valve means.

6. The invention as set forth in claims 1, 2 or 3, wherein the emission gases comprise exhaust gases.

7. The invention as set forth in claim 5 further including a first vacuum motor for operating the control valve means, said first vacuum motor having a first chamber exposed to atmospheric pressure and a second chamber adapted to be exposed to intake manifold vacuum, spring means disposed in said second chamber for urging said control valve means to its open position when the pressure in both of said chambers is equal, first valve means for selectively communicating said second chamber with atmospheric pressure or with induction system vacuum, said Egr valve means including a valve element operated by a second vacuum motor, said second vacuum motor having a first chamber exposed to atmospheric pressure and a second chamber adapted to be selectively communicated with a source of intake manifold vacuum, there being spring means positioned in said second chamber for urging said valve element to its closed position when the pressure in said chambers is substantially equal, second valve means for selectively communicating said second chamber of said second vacuum motor with either atmospheric pressure or a source of intake manifold vacuum, and means for simultaneously moving said first and said second valves to the positions in which they vent said second chambers of both of said vacuum motors to atmospheric pressure for simultaneously opening said control valve means and closing said Egr valve element.

8. The invention as set forth in claim 7 further including a conduit means extending from a portion in the engine induction system to the second chamber of the second vacuum motor, there being a first accumulator in direct communication with said induction system, a second accumulator in communication with said first accumulator, a restrictive orifice in said conduit means between said accumulators for charging said second accumulator at a restricted rate, variable valve means for providing a controlled venting of said second accumulator to atmospheric pressure, said variable valve means providing a degree of resistance to atmospheric venting of said second accumulator in relation to the air flow through the engine induction system, and third valve means for selectively venting said second accumulator to atmospheric pressure when the engine is idling for closing the Egr valve element under idling.

9. The invention as set forth in claims 1, 3 or 8, wherein the engine is a spark ignited engine and has a distributor with only a centrifugal advance.

10. The invention as set forth in claim 9, wherein the flow of emission gases to the chamber is started at approximately the point at which the governor advance of the distributor begins to be operative and is stopped at approximately the point at which the distributor governor advance reaches its maximum advance point so that the required timing of the engine approximates that supplied by said distributor.

* * * * *